US007182179B2

(12) United States Patent
Tolfsen

(10) Patent No.: US 7,182,179 B2
(45) Date of Patent: Feb. 27, 2007

(54) WALKER WITH ADJUSTABLE HANDLEBAR

(75) Inventor: Ulf Tolfsen, Gamle Fredrikstad (NO)

(73) Assignee: Access AS, Hamar (NO)

( * ) Notice: Subject to any disclaimer, the term of this patent is extended or adjusted under 35 U.S.C. 154(b) by 0 days.

(21) Appl. No.: 10/895,903

(22) Filed: Jul. 22, 2004

(65) Prior Publication Data

US 2005/0067804 A1 Mar. 31, 2005

(30) Foreign Application Priority Data

Sep. 30, 2003 (NO) ................................ 20034379

(51) Int. Cl.
*F16F 65/14* (2006.01)
*G05G 13/00* (2006.01)

(52) U.S. Cl. .................... 188/2 D; 188/72.9; 188/73.1; 74/489; 135/85

(58) Field of Classification Search ................ 188/2 D, 188/2 F, 19, 21, 29, 72.9, 73.1; 280/87.041, 280/47.34; 74/502.2, 489; 135/67, 85; D12/130
See application file for complete search history.

(56) References Cited

U.S. PATENT DOCUMENTS

| | | | | |
|---|---|---|---|---|
| 4,029,311 | A * | 6/1977 | Chanslor et al. | 482/68 |
| 4,759,562 | A | 7/1988 | Vinyard et al. | |
| 5,158,313 | A | 10/1992 | Becker | |
| 5,687,991 | A * | 11/1997 | Gairdner | 280/826 |
| 6,032,765 | A * | 3/2000 | Hsi-Chia | 188/19 |
| 6,283,484 | B1 * | 9/2001 | Malmstrom | 280/87.041 |
| 6,481,730 | B2 | 11/2002 | Sung | |

FOREIGN PATENT DOCUMENTS

| | | | |
|---|---|---|---|
| JP | 3232667 | A * | 10/1991 |
| NO | 176593 | | 9/1991 |
| NO | 311925 | B1 | 9/1999 |
| SE | 514269 | | 4/1999 |
| WO | WO-92/06661 | A1 | 4/1992 |
| WO | WO-98/43591 | A1 | 10/1998 |

* cited by examiner

*Primary Examiner*—Melody M. Burch
(74) *Attorney, Agent, or Firm*—Birch, Stewart, Kolasch, and Birch, LLP

(57) ABSTRACT

A walker including a main frame with a main part with a telescopic frame member being slidably adjustable in relation to main part, a handle bar with a brake handle bar for activating a brake via a brake pull wire, a brake wire connected to a brake wire fastener and brake, and a brake tensioner plate arranged in frame member. The brake tensioner plate includes upper, lower and brake tensioner sheaves, one of the brake tensioner sheaves being laterally displaceable and arranged for adjusting the running length of the brake wire, so that the brake wire may be tensioned and the brake activated, for displacement along the brake wire and for telescopic displacement of the frame member, so that tensioning of the brake wire may occur independently from the vertical position of the brake tensioner plate.

19 Claims, 6 Drawing Sheets

WALKER WITH ADJUSTABLE HANDLEBAR

Figure 1A:
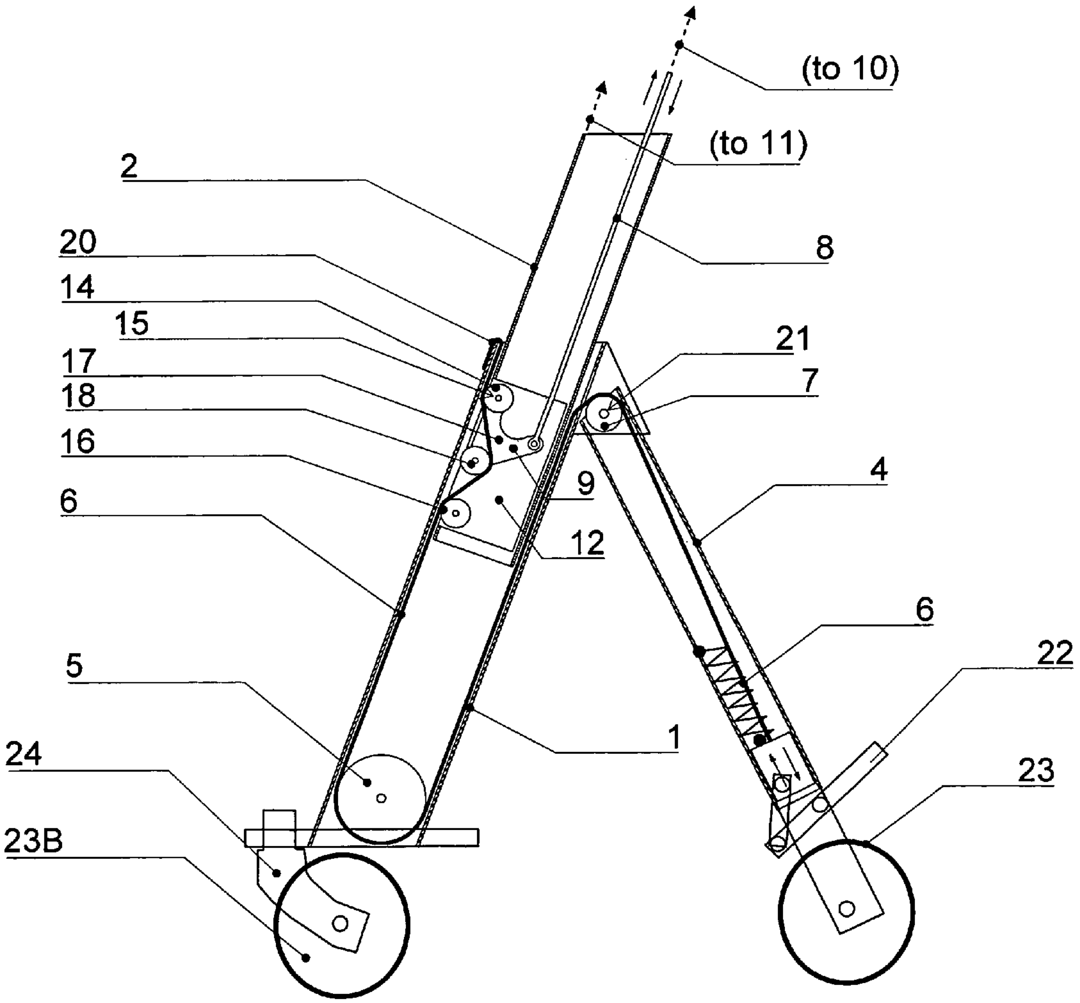

This Nonprovisional application claims priority under 35 U.S.C. § 119(a) on Patent Application No(s). 20034379 filed in Norway on Sep. 30 2003, the entire contents of which are hereby incorporated by reference.

INTRODUCTION

This invention relates to a so-called walker, i.e., a support frame for disabled persons, in which the support frame is provided with wheels. The particular features of this invention is that the support frame is provided with brakes for the wheels, and that no supplementary adjustment of the brakes is required when adjusting the height of the frame or handle bars. Thus, the walker becomes more user friendly and more easily adapted to the particular user. Other advantages of the invention appear from the specification below.

The purpose of the invention is among other things, that the tensioning of a brake wire may occur independently of the adjusted height of the handle bars, and thereby of the telescopic member, in other words, their vertical position.

RELATED ART

Related art often makes use of brake handle bars running in a flexible wire hose between a brake handle bar on the steering handle bar and the brake mechanism on the wheels. In this manner the walker may be tensioned independently of the height of the handle bars and the brake handle bars on the frame. Such brake wires in wire hoses may form a long and broad curve which may be hooked by anything which may protrude or in other ways hamper the movement of the walker, e.g., shop shelves, bushes and shrubbery, fences, arms, signs, children and dogs.

Swedish patent SE 514 269 to Etac AB describes a brake device for walkers comprising a brake member which impacts a wheel, and a brake handle which has a braking position and a locking position. During use the brake member impacts a brake stem in one end of a connecting member. The other end of the connecting member is adjacent to a pressure area in connection with the brake handle. The patent does not show any brake wire.

Norwegian patent NO 311 925 to Sven Malmström describes telescopic height adjustment of the height of the "main stem" with the handle bars and the brake. A corresponding telescopic brake tube runs within the main stem for direct engagement with the periphery or thread of the wheel. In order to adjust the height of the handle bars, a screw is unscrewed, which in other respects locks the telescopic main stem. A corresponding locking screw is present on the telescopic brake tube, but protrudes through the main stem and runs in a slit in the main frame. By adjusting the vertical position of the handle, both locking screws are unscrewed, the telescopic parts of the frame are adjusted and locked by means of the first screw. Thereafter, the other screw is tensioned so as to lock the length of the brake stem. Thus, several screw mechanisms on each side are required for adjusting the height and supplementary adjustment of the brakes.

NO 176 593 Etac AB "Brake device for a walking frame provided with wheels", describes a brake wire which is attached to a lever arm. When the lever arm is turned, the brake is brought into function by being pulled up to or down from a handle bar by means of an operating member which is attached to the lever arm. The brake wire is not integrated in the main frame and does not comprise independent height adjustment.

SUMMARY OF THE INVENTION

The invention solves several of the above problems connected with the risk of the previous, externally arranged brake wire to be hooked or get stuck, and that the internal running brake wire or brake stems will have to be subject to supplementary adjustment etterjusteres by means of several different screws or locking pins when adjusting the height of the handle bars, or that some of the previously known walkers are not adjustable, so that they have to be manufactured in many different frame sizes. An embodiment of the invention is a walker with wheels with a brake and includes the following features:

- a main frame comprising a main part with a telescopic frame member running in a generally vertical direction in the main part, and which is slidably height adjustable in relation to the main part,
- a handle bar mounted to the telescopic frame member, together with a brake handle, which via a brake pull wire or brake bar is arranged for activating the brake on a wheel, in which the walker further comprises:
- a frame wire attached in an upper brake wire fastener on an upper portion on the main part of the main frame, in which a lower end or part of the brake wire is connected with the brake;
- a brake tensioner plate arranged in a lower portion of the telescopic frame member, below the upper brake wire fastener;
  - in which the brake tensioner plate comprises an upper sheave and a lower sheave for the brake wire, and a tensioner sheave arranged between the upper and the lower sheave, in which the tensioner sheave is laterally displaceable and thus arranged for adjusting the running length of the brake wire between the upper and the lower sheave, so that the brake wire is tensioned, thus activating the brake,
  - in which the brake tensioner plate with the upper sheave, the lower sheave and the tensioner sheave, is arranged to be slided along the brake wire together with the telescopic sliding of the telescopic frame member;

so that the tensioning of the brake wire occurs independently of the vertical position of the brake tensioner plate and preferably the telescopic part.

SHORT DESCRIPTION OF THE DRAWINGS

Embodiments of the invention are illustrated in the attached drawings. The drawings are intended for illustrating the embodiments of the invention, however, they should not be construed so as to limit the scope of the invention.

Figure 3:
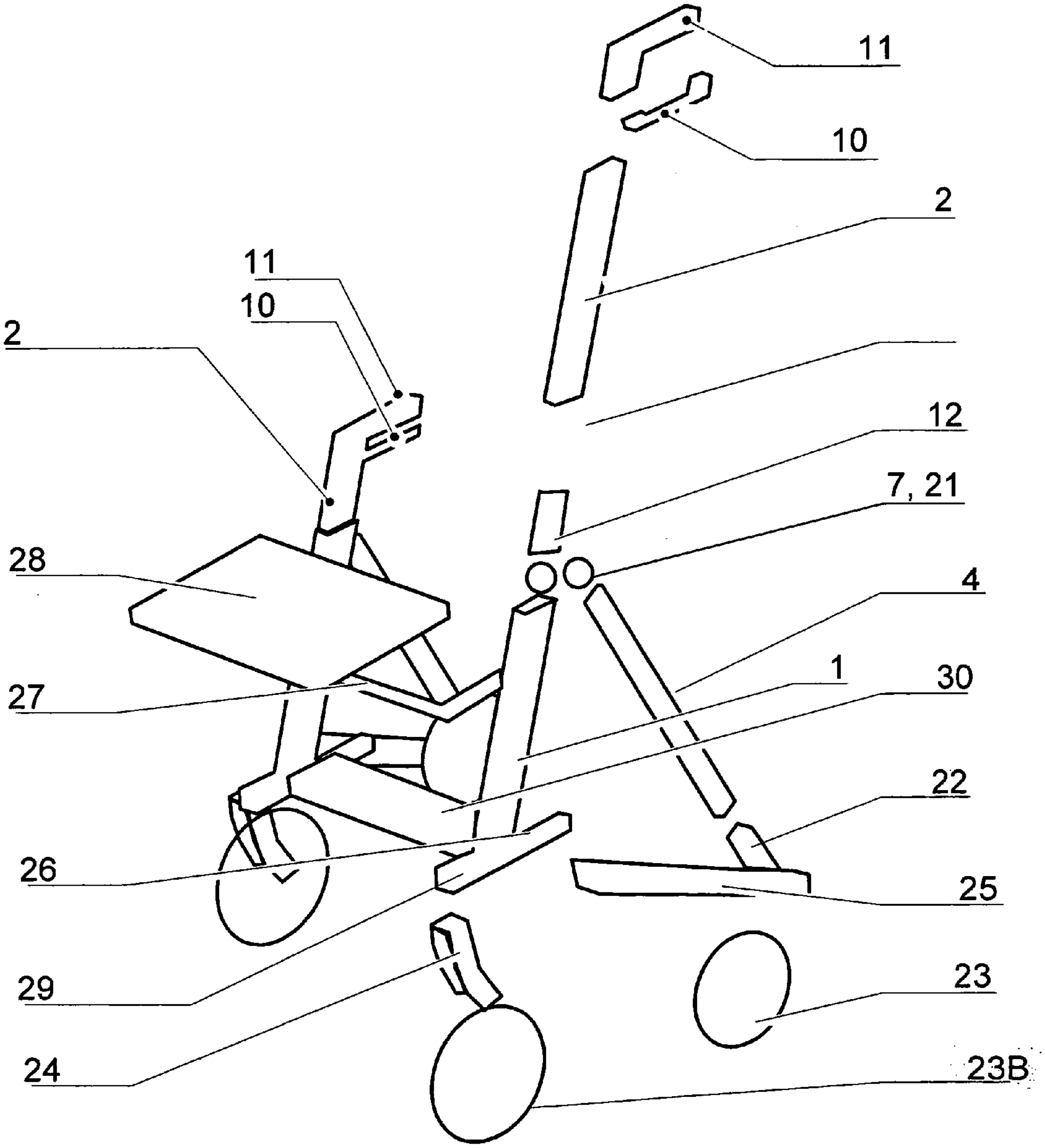
Figure 4:
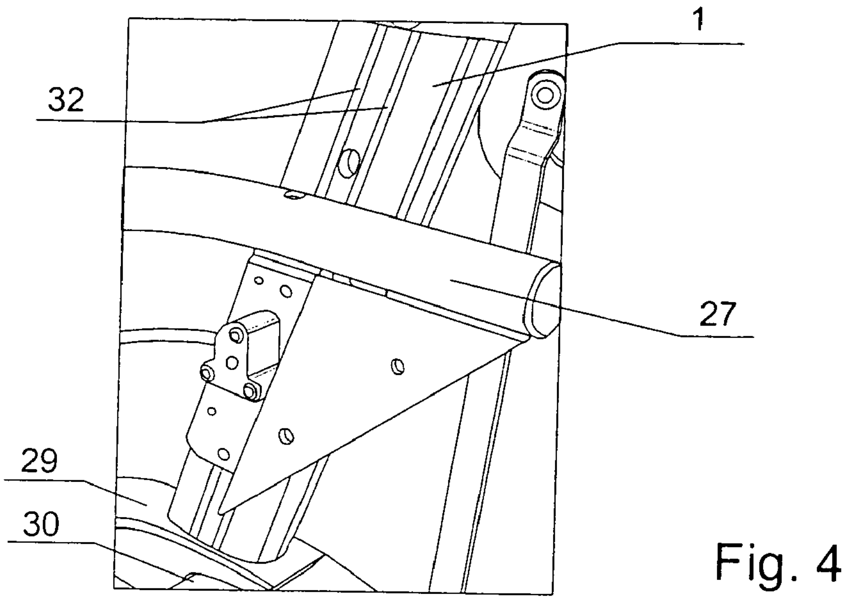
Figure 5:
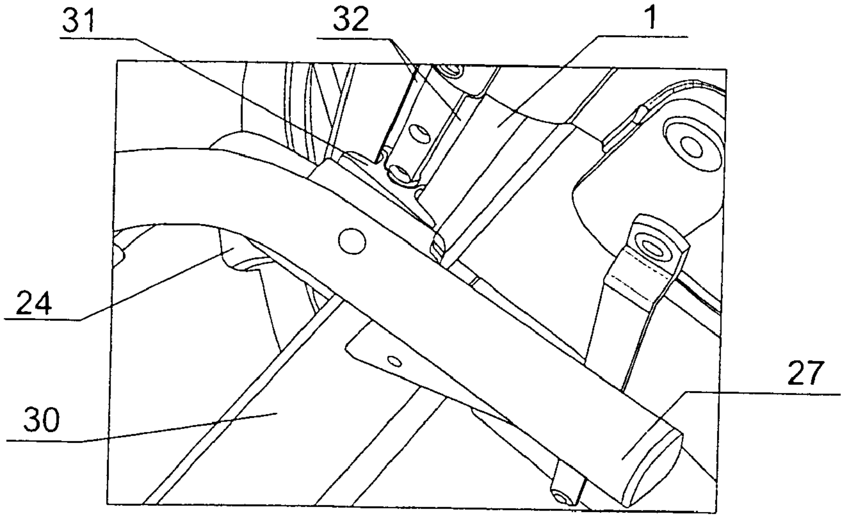

FIG. 1*a* is a sectional view of a generally vertical main frame of a walker according to an embodiment of the invention. A sheave and wire system within the vertical main frame is shown schematically in the section. A brake wire tensioner plate is shown arranged on a lower end of an upper telescopic generally vertically slidable part. The upper telescopic frame member is shown in an elevated position. Details such as handle bars and wheels are shown in FIG. 3.

Figure 1B:
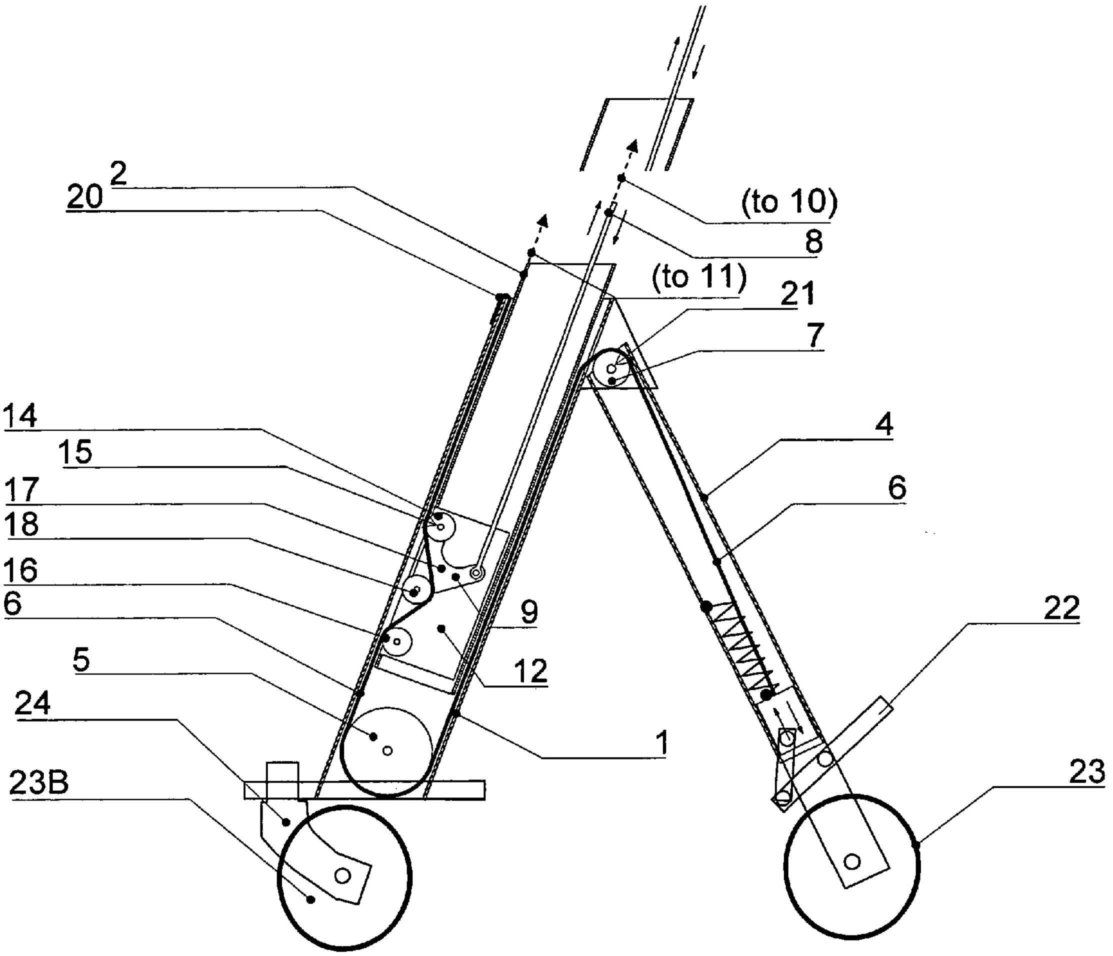

FIG. 1*b* corresponds to FIG. 1*a* except that the telescopic slidable part of the vertical frame is shown in a lowered position together with the brake wire tensioner plate.

Figure 2A:
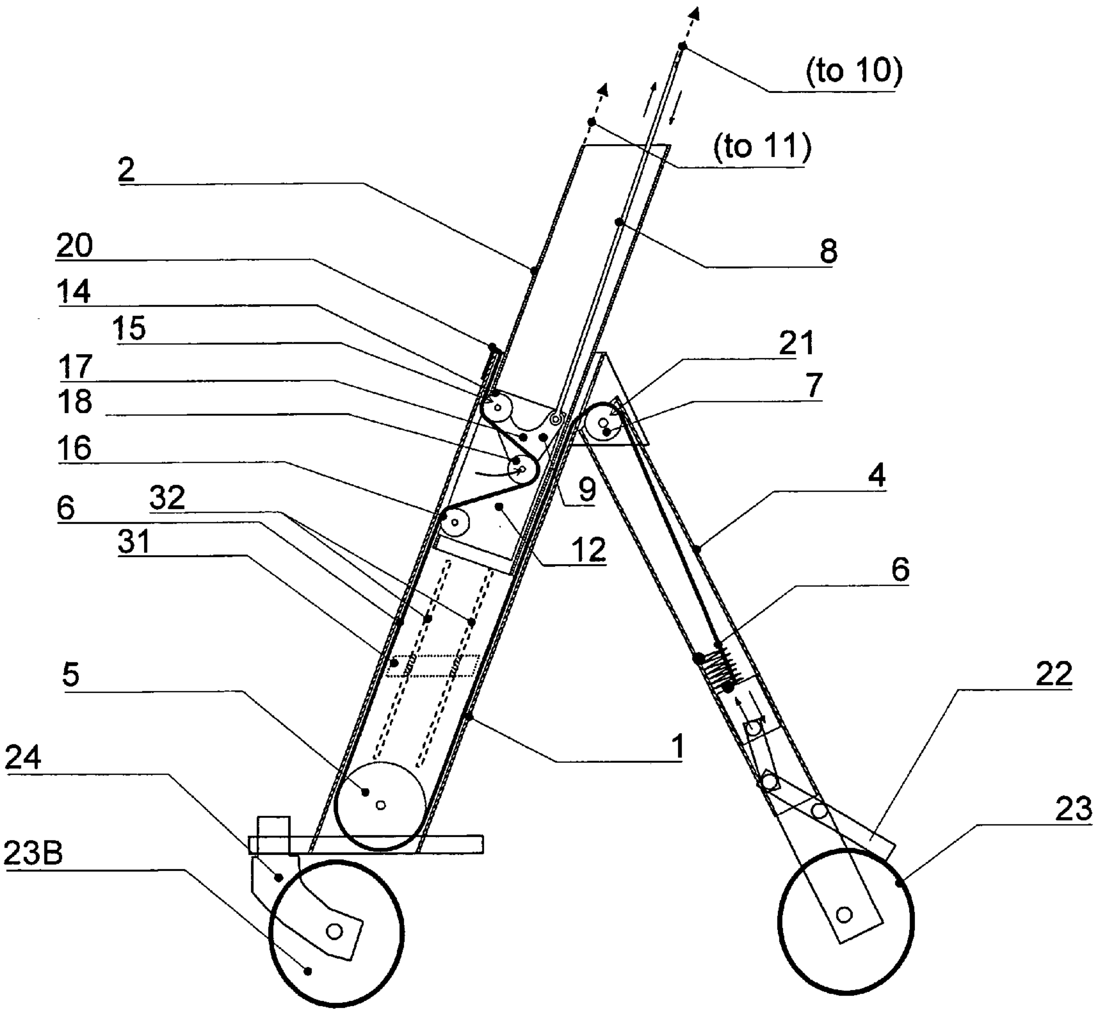

FIG. 2*a* corresponds to FIG. 1*a* concerning mutual height adjustments of the frame parts, and shows that a brake bar has been tensioned (by means of a brake handle, shown in FIG. 3) so that a sheave which runs behind the brake wire, pulls the brake wire from its less tensioned position to a more tensioned position, so that a brake mechanism in the lower end of the brake wire is tensioned so that the brake is activated.

Figure 2B:
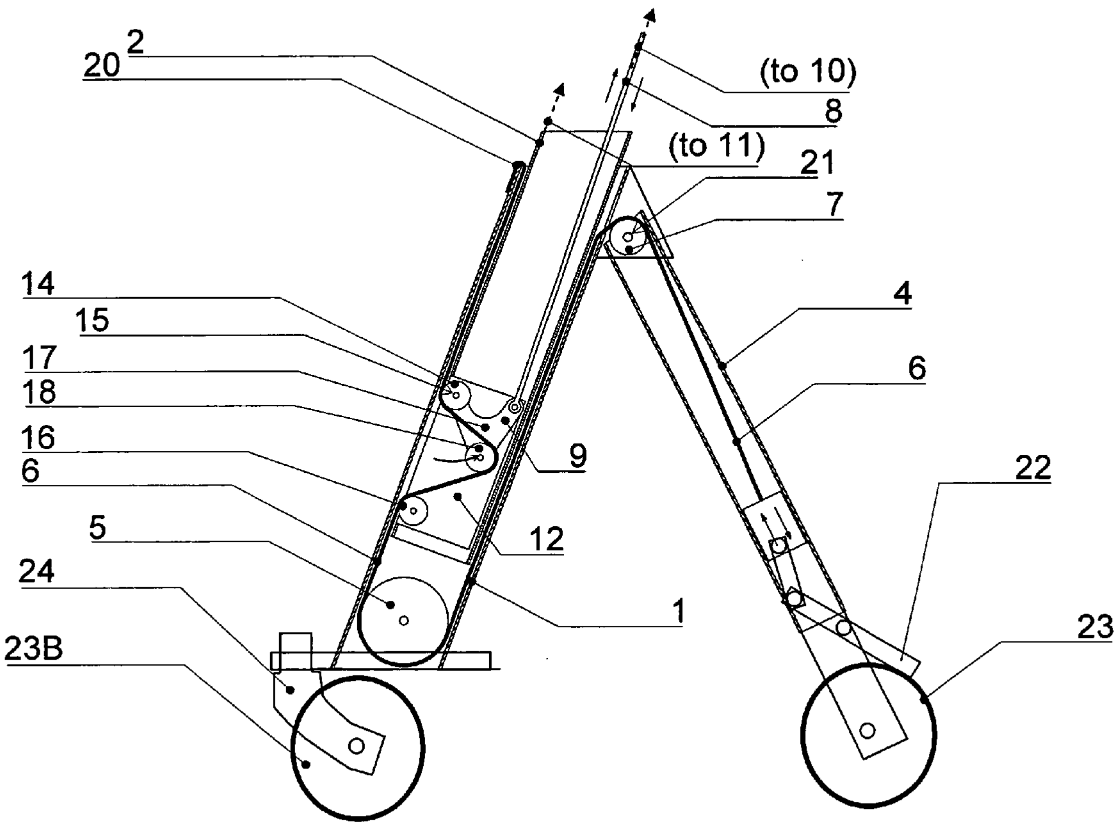

FIG. 2*b* similarly corresponds to FIG. 1*a* concerning when the mutual height positions of the frame parts, here in a lowered position, and shows likewise that brake bars have been tensioned so that a sheave running behind the brake wire trekker the brake wire from its less tensioned position to a more tensioned position, so that a brake mechanism in the lower end of the brake wire is tensioned so that the brake is activated. Please note that all intermediate positions of the brake tensioner plate and thus the upper telescopic frame member provides the same tension of the brake wire for the same tension force on the brake bar. Thus, the handle bar height may be adjusted without offering the brake adjustment a thought.

In addition, it can be seen from the FIGS. 1*a* to 2*b* that if the rear support leg hinged to the upper end is pushed towards the telescopic main frame, the brake will be somewhat tensioned because the wire will have to or run a somewhat longer path around the sheave in the hinged spot, which is an advantage because the assembled rollator thus will not roll about on the rear set of wheels when remaining lying.

FIG. 3 shows a perspective view seen aslant and from the front, in a partly exploded view of the left side of the rollator, so that the brake tensioner plate 12 arranged at the lower end of the upper telescopic part of the main frame (1) is visible.

DESCRIPTION OF A PREFERRED EMBODIMENT OF THE INVENTION

The invention relates to a walker of which an embodiment is illustrated in a partly exploded view in FIG. 3, with main frame (1) shown in the FIGS. 1*a*, 1*b*, 2*a*, and 2*b*. The main frame (1) is oblique, almost vertical, and is retained in position by a horizontal transversally positioned beam (30) shown in FIG. 3. The walker is provided with a rear frame leg (4), one or more rear wheels (23) and one or more front wheels (23B). The user holds and guides the walker by means of a handle bar (11). The walker is provided with a brake (22) which may be activated, tensioned and adjusted, directly or indirectly, by means of a brake bar (8), e.g., such as indicated on FIGS. 1*a* to 2*b*, through a brake handle bar (10) shown in FIG. 3. The brake (22) itself is shown schematically in FIGS. 1*a*–2*b*, as a rear brake being activated for braking the rotation of at least one of the rear wheels (23), or for blocking at least one of the rear wheels (23) from rotating.

The walker according to an embodiment of the invention comprises the following features:—a main frame (1) with a telescopic frame member (2) running generally in a vertical direction in the main frame (1). The height of the telescopic frame member (2) is slidably adjustable in relation to the main frame (1), and may be locked in the desired height by utilizing pins or screws or corresponding locking mechanism. The handle bar (11) (FIG. 3) is mounted near the top of the telescopic frame member (2). A brake handle (10), is also mounted near the top of the telescopic frame member (2). The brake handle may be pulled up or be pushed down to activate the brake (22) via the brake bar (8). It is also possible to arrange the brakes so that the brake bar (8), by being pulled up or pushed down deactivates the brake. In other words, when the brake handle bar (10) is not loaded, the brake is activated and the walker stands alone.

A solution to the problem as mentioned above is a brake wire (6) one end of which is attached to an upper brake wire fastener (20) on a portion located high on the main frame (1). The other end of the brake wire (6) is connected to the brake (22). The brake wire (6) may run indirectly to the brake (22) via a lower frame sheave (5), over an upper frame sheave (7) and down again to the brake (22) on a frame leg (4) as shown in FIG. 1. In an alternative embodiment of the invention, the brake wire (6) may run straight down to a brake (22) on the front wheel mounted on the lower end of the main frame (1). However, it is more likely that a walker with a front brake will tilt over than a walker with a rear brake. For this reason, a rear brake is preferred.

A brake tensioner plate (12) is arranged in a lower portion of the telescopic frame member (2). It is preferred that the brake tensioner plate be arranged below the brake wire fastener (20). In a preferred embodiment of the invention, the brake wire (6) is kept internal in its entirety within the walker, both in the main frame (1) and in the telescopic frame member (2).

The brake tensioner plate (12) includes an upper sheave (14) and a lower sheave (16) for the brake wire (6), and a tensioner sheave (18) arranged between the upper and the lower sheave (14, 16). In the preferred embodiment the brake tensioner plate is arranged in the lower portion of the telescopic member (2). The tensioner sheave (18) is laterally slidable, and thus arranged for adjusting the running length of the brake wire (6) between the upper and the lower sheave (14, 16), so that the brake wire (6) may be tensioned, and thus activating the brake (22), please see the difference between FIG. 1*a* and FIG. 2*a*, or between FIG. 1*b* and FIG. 2*b*. As an alternative, the brake may be activated when the brake wire (6) is relaxed. The brake tensioner plate (12) with the upper sheave (14), the lower sheave (16) and the tensioner sheave (18) is arranged for sliding along the brake wire (6) in the telescopic frame member (2). Therefore, the tensioning of the brake wire (6) will occur independently of the vertical position of the brake tensioner plate (12) and the telescopic member (2).

The tensioner sheave (18) rests on a brake tensioner arm (17) being pivotable about a brake tensioner pivotal axis (15), which also may act as a shaft for upper sheave (14). The brake tensioner arm (17) is provided with a torque arm (9) which makes an angle in relation to the brake tensioner arm (17) and also an angle in relation to the brake bar (8), so that when the brake bar (8) is tensioned, a torque on the torque arm (9) will turn the tensioner arm (17) and move the tensioner sheave (18) so that the running length of the wire (6) between the sheaves (14) and (16) is extended, and vice versa.

According to a preferred embodiment of the invention the brake wire (6) runs from the upper brake wire fastener (20) on the portion located high on the main frame (1), via a lower sheave (5) at the lower end of the main frame (1), and in which the brake wire (6) is further connected to the brake (22).

According to an embodiment of the invention, the brake wire (6) and the brake tensioner plate (12) are arranged to be within the main frame (1). The brake wire (6) and the brake tensioner plate (12) can also be arranged to be within the telescopic frame member (2). This arrangement provides for the brake wire (6) to be protected against mechanical impact from the main frame (1), so that no wire parts protrudes and may be hooked by protruding objects as described in the beginning of the specification.

The brake tensioner plate (12) may constitute a lower portion of the telescopic frame member (2) itself which projects down into the main frame.

According to a another embodiment of the invention, the brake on the rear wheel is used by means of the brake wire (6) running from the lower frame sheave (5) in the main frame (1) via an upper frame sheave (7) on the frame leg (4) holding the brake (22) which impacts the rear wheel (23). The frame leg (4) then constitutes a rearwardly directed slanted frame leg when driving in the normal usage direction. The frame leg (4) is pivotally mounted in the main frame (1) about a shaft (21) preferably constituting the pivotal axis for the upper frame sheave (7). In this embodiment the brake (22) impacts the rear wheel (23) on the frame leg (4). The rear wheel (23) is located somewhat behind a vertical line beneath the handle bar (11) and the rear wheel (23) is not pivotable in relation to the main frame (1).

The front wheels (23B) are arranged beneath the lower end of the main frame (1) in a pivotable fork (24) mounted to a horizontal beam (29) on the lower part of the main frame (1), and a hinged bar (25) leads from the rear portion of horizontal bar (29) back to the lower portion of the rear frame leg (4). Thus, the walker provides a directional stability and a lateral stability because the rear wheels (23) are not pivotable, while at the same time the front wheels (23B) provide for simple pivotal properties.

An advantage of the embodiment of the invention is the following. When the walker is folded, i.e. the rear frame leg (4) abuts the main frame (1), the brake wire (6) will have to run a greater length about the upper frame sheave (7) and thus, the brake (22) is activated. This prevents the walker from rolling in its folded position, e.g., in a cargo compartment in a passenger vehicle.

As shown in FIG. 3, the right and left portions of the main frame (1) are connected via a transversal horizontally directed beam (30), and where a seat (28) is arranged between the right and left portions of the main frame (1). This seat is, in a preferred embodiment of the inventions, height adjustable by being mounted to a bow (27) which in turn is mounted to right and left fasteners, respectively, which runs in longitudinal profile grooves on an inwardly directed side each of the slanted, almost vertical main frames (1). A lever under the seat (28) to a spring loaded pin in the fasteners releases or locks the fasteners through apertures in the main frames (1), and so the seat may be set in the desired height and locked.

The invention claimed is:

1. A walker with a brake, comprising:

a main frame with a telescopic frame member running generally in a vertical direction in the main frame, a height of the telescopic frame member is adjustable in relation to a main portion of the walker;

a handle bar mounted to the telescopic frame member, wherein the handle bar together with a brake handle is arranged to activate the brake via a brake bar;

a brake wire, wherein a first end of the brake wire is attached to an upper brake wire fastener on an upper portion of the main frame and wherein a second end of the brake wire is connected to the brake; and a brake tensioner plate arranged in a lower portion of the telescopic frame member and below the upper brake wire fastener, the brake tensioner plate comprising an upper sheave and a lower sheave for the brake wire, and a tensioner sheave arranged between the upper and the lower sheaves in which the tensioner sheave is displaceable, the tensioner sheave being arranged for adjusting a running length of the brake wire between the upper and the lower sheaves so that the brake wire may be tensioned to activate the brake, wherein the brake tensioner plate is arranged to be slideable along the brake wire and arranged to be movable together with the telescopic frame member so that the tensioning of the brake wire occurs independently of the vertical position of the brake tensioner plate.

2. The walker according to claim 1, wherein the tensioner plate further comprises a brake tensioner arm and a torque arm connected to the brake tensioner arm, wherein the tensioner sheave rests on the brake tensioner arm being rotatable about a pivotal axis centered on the upper sheave, and in which the brake tensioner arm is provided with the torque arm which forms a first angle in relation to the brake tensioner arm and forms a second angle in relation to the brake bar, so that when the brake bar is tensioned, the force on the torque arm rotates the brake tensioner arm to move the tensioner sheave to cause the running length of the wire between the lower and upper sheaves to be extended, and vice versa.

3. The walker according to claim 1, wherein the brake wire runs from the upper brake wire fastener on the upper portion of the main frame to the brake via a lower frame sheave at a lower end of the main frame.

4. The walker according to claim 1, wherein the brake wire and the brake tensioner plate are arranged within the telescopic frame member.

5. The walker according to claim 1, wherein the brake wire and the brake tensioner plate are arranged within the telescopic frame member within the main frame.

6. The walker according to claim 1, wherein the brake tensioner plate constitutes a lower portion of the telescopic frame member.

7. The walker according to claim 3, wherein the brake wire runs from the lower frame sheave in the main frame via an upper frame sheave on a frame leg holding the brake which impacts at least one wheel on the frame leg.

8. The walker according to claim 7, wherein the frame leg is pivotally mounted in the main frame about a shaft which constitutes a rotation axis for the upper frame sheave.

9. The walker according to claim 7, wherein the brake impacts the at least one wheel on the frame leg and in which the at least one wheel is a rear wheel, and in which the frame leg is a rear frame leg and so that the rear wheel is located behind a vertical line beneath the handle bar and in which the rear wheel is not pivotable on a fork in relation to the main frame.

10. The walker according to claim 9, wherein a front wheel is arranged beneath the lower end of the main frame in a pivotable fork mounted on a generally horizontal beam on the lower part of the main frame, and in which a hinged bar leads from the rear portion of the horizontal beam and back to a lower portion of the rear frame leg.

11. The walker according to claim 8, wherein a rotational movement of a rear frame leg inwardly towards the main frame about the shaft which also holds the upper frame sheave is such that the brake wire runs a greater length about the upper frame sheave such that the brake is activated when the walker is in its folded position.

12. The walker according to claim 1, wherein right and left portions of the main frame are connected via a transversal horizontally directed beam, and in which a seat is arranged between the right and left portions of the main frame.

13. A walker comprising:

a main frame;

a telescopic member slideably attached internal to the main frame;

a brake handle attached to a top portion of the telescopic member;

a frame leg pivotally attached external to the main frame on a pivot point adjacent to the main frame;

a brake attached on a lower end of the frame leg;

a brake wire, wherein a first end of the brake wire is fixedly attached to a brake fastener mounted on the main frame and a second end of the brake wire is connected to the brake;

a tensioner plate slideably connected internal to the main frame, wherein a position of the tensioner plate is fixed relative to a position of the telescopic member; and a brake bar, wherein a first end of the brake bar is attached to the brake handle and a second end of the brake bar is attached to the tensioner plate, wherein the brake wire runs from the brake fastener through the tensioner plate over an upper tensioner sheave on the tensioner plate, over a movable tensioner sheave on the tensioner plate, and over a lower tensioner sheave on the tensioner plate within the main frame and through the frame leg to the brake, and wherein when the brake handle is activated, the tensioner plate is activated via a movement of the brake bar to cause a change in a length of the brake wire extending between the upper and the lower tensioner sheaves to thereby activate or deactivate the brake.

14. The walker of claim 13, further comprising:

a lower frame sheave rotatably attached to a lower portion of the main frame such that the brake wire runs from the brake fastener, through the tensioner plate and then around the lower frame sheave, before being attached to the brake.

15. The walker of claim 14, further comprising:

an upper frame sheave rotatably attached to an upper portion of the frame leg such that the brake wire runs around the lower frame sheave and then around the upper frame sheave before being attached to the brake.

16. The walker of claim 13, wherein the tensioner plate is slideable in relation to the brake wire.

17. The walker of claim 13, wherein when the brake handle is activated, the tension of the brake wire is increased to thereby cause a change in the running length of the brake wire within the frame leg.

18. The walker of claim 13, wherein the tensioner plate comprises:

the upper tensioner sheave;

a tensioner arm pivotally attached to the upper tensioner sheave such that the tensioner arm pivots about a center of the upper tensioner sheave;

a torque arm fixedly attached to the tensioner arm and attached to the brake bar so that when the brake bar moves, the torque arm and the tensioner arm pivot about the center of the upper tensioner sheave;

the movable tensioner sheave attached to the tensioner arm such that the movable tensioner sheave also pivots about the center of the upper tensioner sheave as the tensioner arm moves; and the lower tensioner sheave, wherein the brake wire runs from the brake fastener in order around the upper tensioner sheave, around the movable tensioner sheave and around the lower tensioner sheave such that when the brake handle is activated to cause the brake bar to move, a length of the brake wire running through the tensioner plate is changed to thereby cause a corresponding opposite change in the length of the brake wire in the frame leg.

19. The walker of claim 18, wherein when the brake handle is activated, the length of the brake wire running through the tensioner plate is lengthened.

* * * * *